(12) United States Patent
Guan et al.

(10) Patent No.: US 9,922,132 B2
(45) Date of Patent: Mar. 20, 2018

(54) METHOD AND APPARATUS FOR SPEEDING UP WEB PAGE ACCESS

(71) Applicant: Tencent Technology (Shenzhen) Company Limited, Shenzhen, Guangdong (CN)

(72) Inventors: Liangliang Guan, Shenzhen (CN); Feng Liu, Shenzhen (CN); Ruiyang Wang, Shenzhen (CN); Yang Zhong, Shenzhen (CN); Jingyu Yang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 606 days.

(21) Appl. No.: 14/548,010

(22) Filed: Nov. 19, 2014

(65) Prior Publication Data

US 2015/0081835 A1    Mar. 19, 2015

Related U.S. Application Data

(63) Continuation of application No. PCT/CN2013/075824, filed on May 17, 2013.

(30) Foreign Application Priority Data

May 21, 2012   (CN) .......................... 2012 1 0158401

(51) Int. Cl.
*G06F 15/16* (2006.01)
*G06F 17/18* (2006.01)
(Continued)

(52) U.S. Cl.
CPC .. *G06F 17/30902* (2013.01); *G06F 17/30893* (2013.01); *H04L 67/2842* (2013.01)

(58) Field of Classification Search
USPC ................ 709/213, 235, 203, 246, 217, 221
See application file for complete search history.

(56) References Cited

U.S. PATENT DOCUMENTS

| 2002/0178232 | A1* | 11/2002 | Ferguson | ........... G06Q 30/0251 709/217 |
| 2003/0225569 | A1* | 12/2003 | Shimamura | ......... G06F 17/2836 704/2 |

(Continued)

FOREIGN PATENT DOCUMENTS

| CN | 101221580 A | 7/2008 |
| CN | 101640728 A | 2/2010 |

(Continued)

OTHER PUBLICATIONS

International Search Report; PCT/CN2013/075824; dated Jul. 11, 2013; 2 pages.

(Continued)

*Primary Examiner* — Jude Jean Gilles
(74) *Attorney, Agent, or Firm* — Knobbe Martens Olson & Bear LLP

(57) ABSTRACT

Embodiments of the present invention disclose a method and apparatus for speeding up Web page access, pertaining to the network field. The method includes: acquiring a URL address initiated by a user; judging whether the URL address is stored in a preset cache database, where the cache database stores a plurality of mapping relationships between URL addresses and cache data; and when it is judged that the URL address is stored in the preset cache database, acquiring cache data corresponding to the URL address from the cache database, processing the cache data, and rendering the Web page. According to the embodiments of present invention, logic for implementing the cache database is added at the (Continued)

browser end. In this way, no matter a Web server or a proxy server complies with the HTTP.

12 Claims, 3 Drawing Sheets

(51) Int. Cl.
    *G06F 17/30*     (2006.01)
    *H04L 29/08*     (2006.01)

(56) References Cited

U.S. PATENT DOCUMENTS

| | | | | |
|---|---|---|---|---|
| 2007/0254631 | A1* | 11/2007 | Spooner | G06F 21/6218 455/411 |
| 2010/0036797 | A1* | 2/2010 | Wong | G06F 17/3087 706/55 |
| 2010/0180082 | A1* | 7/2010 | Sebastian | H04L 67/2842 711/126 |
| 2012/0198558 | A1* | 8/2012 | Liu | G06F 21/53 726/25 |
| 2013/0111325 | A1* | 5/2013 | Yue | G06F 17/30902 715/234 |
| 2014/0149995 | A1* | 5/2014 | Tian | G06F 17/30899 719/313 |

FOREIGN PATENT DOCUMENTS

| | | |
|---|---|---|
| CN | 101807180 A | 8/2010 |
| CN | 102402518 A | 4/2012 |

OTHER PUBLICATIONS

Office Action issued in Indonesian Patent Application No. P00201407849 dated Oct. 28, 2016, in 3 pages.

Office Action issued in Chinese Patent Application No. CN201210158401.0 dated Feb. 28, 2015, in 7 pages.

\* cited by examiner

METHOD AND APPARATUS FOR SPEEDING UP WEB PAGE ACCESS

CROSS-REFERENCE TO RELATED APPLICATIONS

This application is a continuation of International Application No. PCT/CN2013/075824, filed on May 17, 2013, which claims the benefit of Chinese patent application No. 2012/10158401.0, filed on May 21, 2012 and entitled "Method and Apparatus For Speeding Up Web Page Access." Each of these prior applications is incorporated herein by reference in its entirety.

BACKGROUND

Field

The present disclosure relates to the network field, and in particular, to a method and apparatus speeding up Web page access.

Description of the Related Art

With the development of network, more and more people acquire information from the Internet. Typically, various requests are sent to a Web server by using a client browser program of Web services, and hypertext information and various formats of multimedia data sent by the server are interpreted, displayed and played.

According to a first implementation in the prior art, the HTTP cache technology is used to speed up Web page access, and communication between a browser and a Web server complies with the HTTP cache protocol. When the browser accesses a specific uniform/universal resource locator (URL) address, if the locally cached data does not expire, the browser directly acquires the data locally to complete Web page access, instead of sending an HTTP request to the Web server; and if the locally cached data has expired, the browser carries the locally cached data in an HTTP request, and sends the HTTP request to the Web server. If judging that the data has not changed, the Web server returns an instruction to the browser, instructing the browser to still acquire the data locally to complete Web page access; and if judging that the data has changed, the Web server returns the corresponding data to the browser.

According to a second implementation in the prior art, the content delivery network (CDN) technology is used to speed up Web page access. During access of a Web page, the bottlenecks and elements that affect data transmission speed and stability over the Internet are avoided as much as possible. In this way, content transmission on the accessed Web page is faster and more stable. Therefore, a user can access the desired content nearby, which both avoids network congestion and improves response speed of accessing the Web site.

During the implementation of the embodiments of the present invention, the inventor finds that the prior art has at least the following problems:

In the first implementation in the prior art, the Web page access cannot be speeded up ideally in a complicated network environment. For example, when the browser and the Web server communicate with each other by using a proxy server, the HTTP cache protocol may become invalid. In the second implementation in the prior art, Web page access cannot be speeded up in scenarios where the bottlenecks and elements affecting data transmission cannot be avoided.

SUMMARY

To improve Web page access speed, embodiments of the present invention provide a method and apparatus for speeding up Web page access. The technical solutions are as follows:

In one aspect, an embodiment of the present invention provides a method for speeding up Web page access, where the method includes:
  acquiring a URL address initiated by a user;
  judging whether the URL address is stored in a preset cache database, where the cache database stores a plurality of mapping relationships between URL addresses and cache data;
  when it is judged that the URL address is stored in the preset cache database, acquiring cache data corresponding to the URL address from the cache database, processing the cache data, and rendering the Web page.

Furthermore, before acquiring a URL address initiated by a user, the method further includes:
  collecting a plurality of Web pages according to a preset data collection program to acquire N URL addresses, N being an integer greater than 1; and
  acquiring cache data corresponding to each of the N URL addresses, and storing the N URL addresses and the cache data corresponding to each of the N URL addresses in a cache database.

The data collection program includes M collection factors, M being an integer greater than 1; and the collecting a plurality of Web pages according to a preset data collection program to acquire N URL addresses specifically includes:
  judging whether the URL address of each of the plurality of Web pages satisfies one of the M collection factors; and
  acquiring the URL address when the URL address of the Web page satisfies one of the M collection factors.

The collection factors includes at least update times of the URL address, update time of the URL address, and status code of the URL address.

The acquiring cache data corresponding to the URL address from the preset cache database specifically includes:
  judging whether the current browser is IE kernel-based or webkit kernel-based;
  when the browser is IE kernel-based, calling Asynchronous Pluggable Protocols and acquiring the cache data corresponding to the URL address from the cache database; and
  when the browser is webkit kernel-based, calling an interface for proactive resource load notification and acquiring the cache data corresponding to the URL address from the cache database.

In one aspect, an embodiment of the present invention provides an apparatus for speeding up Web page access, where the apparatus includes:
  an acquiring module, configured to acquire a URL address initiated by a user;
  a judging module, configured to judge whether the URL address is stored in a preset cache database, wherein the cache database stores a plurality of mapping relationships between URL addresses and cache data;
  a processing module, configured to: when the judging module judges that the URL address is stored in the preset cache database, acquire cache data corresponding to the URL from the cache database, process the cache data, and render the Web page.

Furthermore, the apparatus further includes a collecting module and a cache database.

the collecting module is configured to collect a plurality of Web pages according to a preset data collection program to acquire N URL addresses, N being an integer greater than 1, and acquire cache data corresponding to each of the N URL addresses; and the cache database is configured to store each of the N URL addresses collected by the collecting module and the cache data corresponding to each of the N URL addresses.

The collecting module specifically includes a judging unit and a collecting unit.

The judging unit is configured to judge, according to M collection factors included in the preset data collection program, the URL address of each of the plurality of Web pages satisfies one of the M collection factors, M being an integer greater than 1.

The collecting unit is configured to acquire the URL address when the judging unit judges that the URL address of the Web page satisfies one of the M collection factors.

The collection factors includes at least the number of update times of the URL address, update time of the URL address, and status code of the URL address.

The processing module includes an acquiring unit and a processing unit.

The acquiring unit is configured to: when the judging module judges that the URL address is stored in the preset cache database, judge whether the current browser is IE kernel-based or webkit kernel-based; when the current browser is IE kernel-based, call Asynchronous Pluggable Protocols and acquire the cache data corresponding to the URL address from the cache database; when the current browser is webkit kernel-based, call an interface for proactive resource notifications and acquire the cache data corresponding to the URL address from the cache database.

The processing unit is configured to process the cache data and render the Web page.

In one aspect, an embodiment of the present invention provides an device used for a method of speeding up Web page access, where the device includes:
memory, and
one or more processors,
the one or more processors are configured to perform functions as follows:
acquiring a uniform/universal resource locator (URL) address initiated by a user;
judging whether the URL address is stored in a preset cache database, wherein the cache database stores a plurality of mapping relationships between URL addresses and cache data; and
when it is judged that the URL address is stored in the preset cache database, acquiring cache data corresponding to the URL address from the cache database, processing the cache data, and rendering the Web page.

Furthermore, the one or more processors are further configured to perform functions as follows:
collecting a plurality of Web pages according to a preset data collection program to acquire N URL addresses, N being an integer greater than 1; and
acquiring cache data corresponding to each of the N URL addresses, and storing the N URL addresses and the cache data corresponding to each of the N URL addresses in a cache database.

Furthermore, the one or more processors are further configured to perform functions as follows:
judging whether the URL address of each of the plurality of Web pages satisfies one of the M collection factors; and acquiring the URL address when the URL address of the Web page satisfies one of the M collection factors.

Furthermore, the collection factors comprise at least the number of update times of the URL address, update time of the URL address, and status code of the URL address.

Furthermore, the one or more processors are further configured to perform functions as follows:
judging whether the current browser is IE kernel-based or webkit kernel-based;
when the browser is IE kernel-based, calling Asynchronous Pluggable Protocols and acquiring the cache data corresponding to the URL address from the cache database; and
when the browser is webkit kernel-based, calling an interface for proactive resource load notification and acquiring the cache data corresponding to the URL address from the cache database.

The technical solutions provided in embodiments of the present invention achieve the following beneficial effect: logic for implementing the cache database is added at the browser end, so that no matter a Web server or a proxy server complies with the HTTP cache protocol, Web page access can be speeded up.

BRIEF DESCRIPTION OF THE DRAWINGS

For a better understanding of the technical solutions in the embodiments of the present invention, the accompanying drawings for illustrating the embodiments are briefly described below. Apparently, the accompanying drawings in the following description illustrate only some embodiments of the present invention, and a person skilled in the art may derive other accompanying drawings from these accompanying drawings without any creative efforts.

DETAILED DESCRIPTION

To make the objectives, technical solutions, and advantages of the embodiments of the present invention clearer, the following describes the embodiments of the present invention in detail below with reference to the accompanying drawings.

Embodiment 1

Figure 1:
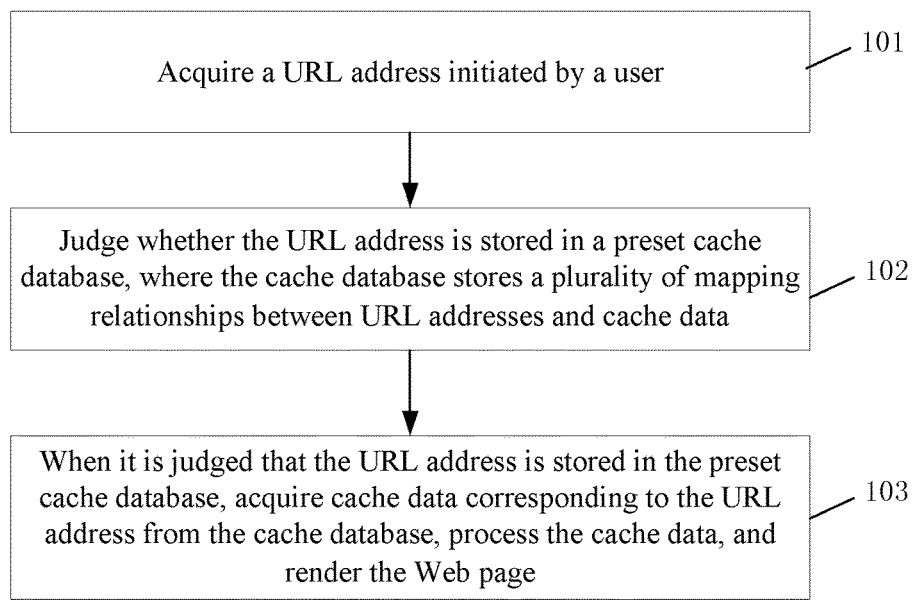
FIG. 1 is a flowchart of a method for speeding up Web page access according to Embodiment 1 of the present invention.

Referring to FIG. 1, an embodiment of the present invention provides a method for speeding up Web page access, where the method includes:
101: acquiring a URL address initiated by a user;
102: judging whether the URL address is stored in a preset cache database, where the cache database stores a plurality of mapping relationships between URL addresses and cache data;
103: when it is judged that the URL address is stored in the preset cache database, acquiring cache data corresponding to the URL address from the cache database, processing the cache data, and rendering the Web page.

With the method provided in the embodiments of the present invention, logic for implementing the cache database is added at the browser end. In this way, no matter a Web server or a proxy server complies with the HTTP cache protocol, Web page access can be speeded up.

Embodiment 2

Figures 2, 3:
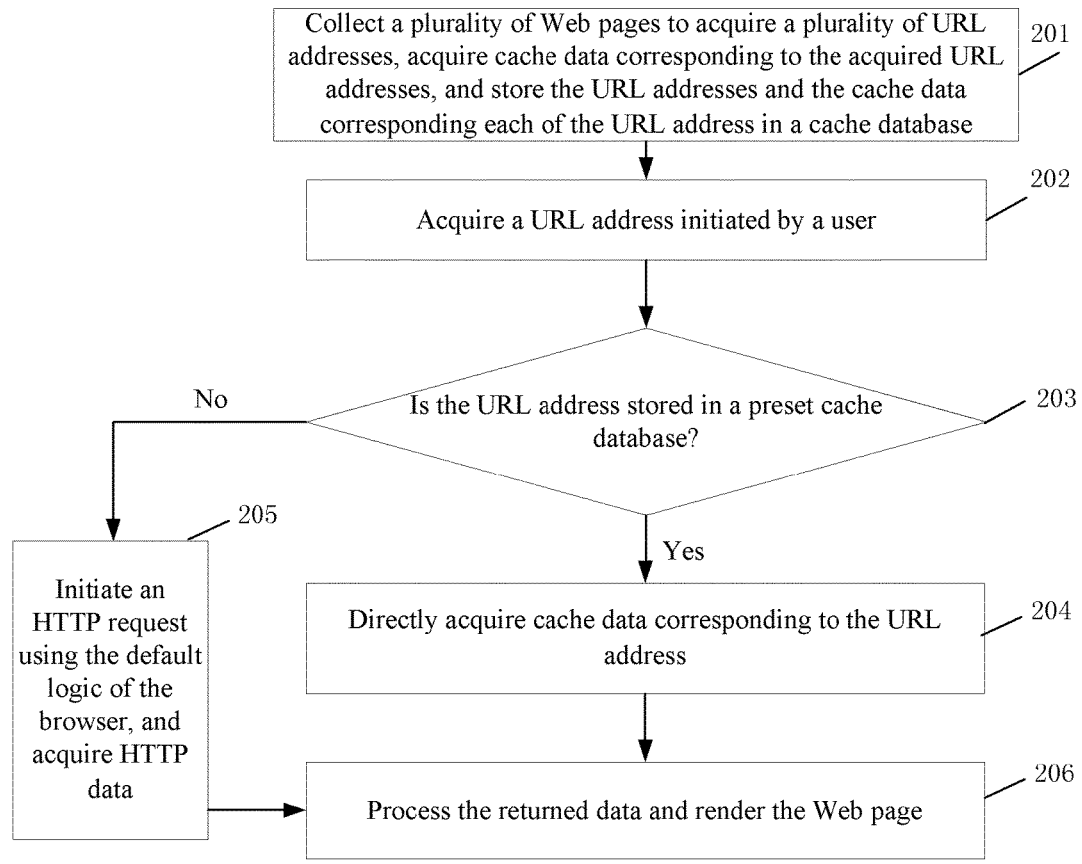
FIG. 2 is a flowchart of a method for speeding up Web page access according to Embodiment 2 of the present invention.
FIG. 3 is a schematic structural diagram of an apparatus for speeding up Web page access according to Embodiment 3 of the present invention.

Referring to FIG. 2, an embodiment of the present invention provides a method for speeding up Web page access, where the method includes: 201: collecting a plurality of Web pages to acquire a plurality of URL addresses, acquiring cache data corresponding to the acquired URL addresses, and storing the URL addresses and the cache data corresponding to each of the URL address in a cache database.

It should be noted that step 201 is a prior step. In step 201, the cache database is created by collecting Web pages and acquiring the cache data. After step 202, Web page access is speeded up by using the created cache database. Step 201 needs to be performed prior to step 202, and has no time-related dependency on step 202. To be specific, it is unnecessary to perform step 201 each time step 202 is performed to initiate Web page access.

For this step, according to embodiments of the present invention, a cache database is set at the browser end, where the cache database stores some URL addresses and cache data corresponding to each of the URL addresses. Web pages can be accessed according to the cache data. Each of the URL addresses stored in the cache database are mainly acquired by analysis by the server on a large number of URL addresses and Web page content corresponding to the addresses, and/or acquired by the client by data collection by a data collection program built in the browser.

The acquiring by the server the to-be-stored URL addresses by analysis on a large number of URL addresses and Web page content corresponding to the addresses specifically includes the following steps: The server analyzes some Web sites that are accessed frequently, to acquire URL addresses of, for example, background pictures and lower level links at the Web sites, and data acquired during access of the URL addresses, where the data acquired during access of the URL address includes but is not limited to: access time, page size, and HTTP status code; the server analyzes the acquired data to acquire the URL addresses to be stored, and sends the URL addresses to be stored to the client. In practice, the server may analyze the URL addresses in various manners according to the data acquired during access of the URL addresses. For example, the server analyzes whether the Web page content corresponding to a URL address has been updated according to the access time and page size during the access of the URL address. The URL address is stored, when the analysis shows that the URL address has not been updated with a period of time. Alternatively, the server analyzes whether a specific URL address is a static Web page or a static resource according to the background pictures and page size. The URL address is stored when the analysis shows that the URL address is the URL address of a static Web page or a static resource. Still alternatively, the server analyzes, according to the acquired status code, whether the status code of a specific URL address has not changed when the URL address is continuously accessed. The URL address is stored if the server returns the same status code when a specific URL address is continuously accessed.

The acquiring by the client the to-be-stored URL addresses through data collection by a data collection program built in the browser specifically includes the following steps: presetting M collection factors, setting the collection factors in a data collection program, and building-in the data collecting program in the browser. The browser collects, according to the preset collection factors, the data generated each time when the URL addresses are accessed; for example, the collected data includes but is not limited to: access time, page size, and HTTP status code. Alternatively, after the data collection program collects the data, any of the following processing manners may be employed: The data collection program reports the collected data to the server such that the URL addresses to be cached are acquired after the server uniformly analyzes the collected data; or the data collection program built in the client acquires the URL address to be cached after analyzing the acquired data.

Specifically, the preset collection factors in the embodiments of the present invention include the following: The URL address will not be updated with a period of time T, T being an empirical value, and in practice, the URL addresses can be collected with a period of time T=24 hours; or the URL address is a static Web page or a static resource, for example, the URL address is HTML, image (JPEG, PNG), CSS, JSS format, etc.; or when a specific URL address is continuously accessed, the server returns the same status code, indicating that the server recommends caching the data corresponding to the URL address. In practice, the status code may be HTTP 304 Not Modified.

In addition, when a plurality of Web pages are collected according to the preset data collection program, specifically, whether the URL address of each of the plurality of Web pages satisfies one of the collection factors is judged. When the URL address satisfies any one of the collection factors, the URL address is acquired. When the URL address fails to satisfy all of the collection factors, the URL address is not processed, i.e., the URL address does not need to be stored in the cache database. In addition, the Web page collection process does not distinguishing dynamic Web pages from static Web pages, and therefore embodiments of the present invention also speed up access of dynamic Web pages.

After the URL address is acquired, the data generated when the URL address is accessed is acquired, and the URL address and the data are cached to the cache database. To be specific, the URL address cached in the cache database is a to-be-stored URL address that is acquired by analysis of the operation personnel or collected according to the collection factors. The to-be-stored URL address refers to the one where the Web page can be accessed without communication with the server each time the URL address is accessed. However, for other URL addresses, for example the URL address where the data generated each time the URL addresses is accessed changes, communication with the server is required each time the URL addresses is accessed. These URL addresses will not be stored in the cache database, and pertain to URL addresses that do not need to be stored according to this embodiment. In this embodiment, setting collection factors for collecting a plurality of Web pages is to judge whether a specific URL address needs to be stored in the cache database. In practice, at least one URL address will be stored in the cache database. In this embodiment, it is assumed that a plurality of Web pages are collected according to the preset data collection program to acquire N URL addresses that need to be stored, and the N URL addresses and the data corresponding to each of the N URL addresses are stored in the cache database.

Table 1 lists data contents stored in the cache database. The cache database caches each of the URL addresses and the cache data corresponding to each URL address. In addition, the cache database further caches MD5 value of the cache data corresponding to each URL address, accumulated number of update times, and previous URL address update time. The MD5 value is to ensure the accuracy of a file, and is a dedicatedly designed check code for preventing the program from theft, Trojan, or counterfeit.

TABLE 1

DATA CONTENTS STORED IN THE CACHE DATABASE

URL address
Cached data corresponding to the URL address
MD5 value of the cached data
Accumulated number of update times
Previous update time

202: acquiring a URL address initiated by a user.
203: judging whether the URL address is stored in a preset cache database; when it is judged that the URL address is stored in the preset cache database, performing step 204; when it is judged that the URL address is not stored in the preset cache database, performing step 205.

The judging whether the URL address is stored in a preset cache database is specifically judging whether the URL address exists in the cache database; when the URL address exists in the cache database, judging that the cache data corresponding to the URL address is stored in the preset cache database; otherwise, judging that the cache data corresponding to the URL address is not stored in the preset cache database.

204: Acquiring Cache Data Corresponding to the URL Address and Performing Step 206.

Specifically, when the URL address initiated by a user is stored in the preset cache database, cache data corresponding to the URL address is acquired from the cache database according to a corresponding relationship between URL addresses and cache data. Therefore, the browser processes the acquired cache data, renders the Web page, and displays the rendered Web page to the user, thereby completing a Web page access process.

It should be noted that, in the universal Web page access process in the prior art, a user generally enters a URL address at the browser; upon receiving the URL address, the browser sends a request message to a server according to the URL address; upon receiving the request message, the server acquires access data corresponding to the URL address, and returns the access data to the browser. The browser hence interprets access data, and performs rendering, and then display the Web page accessed by the user to the user. Different from the prior art, according to the embodiments of the present invention, Web pages frequently accessed by the user, to-be-cached URL addresses recommended by the browser, and the corresponding cache data are stored in the cache database in advance. Therefore, if the URL address initiated by the user is a URL address stored in the cache database, cache data corresponding to the URL address can be directly acquired from the cache data, and hence processed and a Web page access process is completed, without the need of initiating a request to the server. In this way, communication with the server is not required, especially during peak hours of Web site services, which avoids the problem that Web page access speed is slowed due to failure to respond to a large number of requests, and speeds up Web page access.

Preferably, an embodiment of the present invention further provides a method for accessing a Web page when the kernel of a browser is of multi-core type. Different browser kernels correspond to specific URL addresses, thereby speeding up Web page access. The cache mechanism according to this embodiment is different from the HTTP cache mechanism internally supported by the browser according to the prior art. The cache mechanism according to this embodiment includes two implementation modes: IE kernel-based browser, and webkit kernel-based browser.

If the URL address is stored in the preset cache database, and when the browser is IE kernel-based and the IE kernel accesses a specific URL address, the cache data corresponding to the URL address is acquired from the cache database by using Asynchronous Pluggable Protocols. To be specific, the corresponding data is directly returned, without the need of initiating a network request.

If the URL address is stored in the preset cache database, and when the browser is webkit kernel-based and the webkit kernel accesses a specific URL address, the cache data corresponding to the URL address is acquired from the cache database by using the OnBeforeResourceLoad interface, i.e., an interface for proactive resource load notification. To be specific, the corresponding data is directly returned, without initiating a network request.

In addition, in this embodiment, a local proxy server may also be set at the browser end, where the local proxy server complies with the HTTP protocol, and is capable of implementing quick access of a Web page. When the cache data corresponding to the URL address is acquired from the cache database, specifically, the cache data corresponding to the URL address is acquired according to the local proxy server, without the need of using the Asynchronous Pluggable Protocols provided by the IE kernel and/or the OnBeforeResourceLoad interface provided by the webkit kernel.

205: Initiating an HTTP Request to the Server by Using the Default Logic of the Browser, and Acquiring HTTP Data; and Performing Step 206.

In this step, the browser needs to communicate with the server. The browser initiates an HTTP request to the server; upon receiving the HTTP request, the server acquires data corresponding to the HTTP request according to the HTTP request, and returns the acquired data to the browser; and upon receiving the HTTP data, the browser processes the HTTP data and renders the Web page, thereby completing a Web page access process.

206: Processing the Returned Data and Rendering the Web Page.

Specifically, in this step, by using the existing processing logic, the browser processes the returned data, renders the Web page, and displays the rendered Web page to the user, thereby completing a Web page access process.

The following describes the actual effect achieved in a specific test environment by using the technical solutions provided by the embodiments of the present invention.

Operating system: Windows 3 32-bit; CPU: AMD Phenom™ II, X4, 830 processor 2.80 GHz; memory: 4.00 GB; network download bandwidth: 200 kbps.

The effect of speeding up Web page access is tested by using http://cnc.i.gtimg.cn/qzone/space_item/orig/8/71800_top.jpg as the URL address to be accessed. This URL address is a Web address of a picture, the picture size is 91.2 KB, and time points are recorded using the function QueryPerformanceCounter. Twelve access attempts are made before the speedup is started, start time and end time are recorded to calculate time consumed before the speedup is started; and then another 12 access attempts are made after the speedup is started and time consumed after the speedup is started is calculated using the same method. The speedup ratio=(time consumed before the speedup is started−time consumed after the speedup is started)/time consumed before the speedup is started.

TABLE 2

Comparison between the time consumed for accessing the same URL address before speedup is started and the time consumed after speedup is started

| Time Consumed Before Speedup Is Started | Time Consumed After Speedup Is Started | Speedup Ratio |
| --- | --- | --- |
| 2920278 | 1085378 | 62.83% |
| 3517240 | 1142904 | 67.51% |
| 3256770 | 1125135 | 65.45% |
| 3047758 | 1109925 | 63.58% |
| 3158627 | 1122363 | 64.47% |
| 3456352 | 1089773 | 68.47% |
| 2775567 | 1352016 | 51.29% |
| 3345889 | 1111615 | 66.78% |
| 2765925 | 1080744 | 60.93% |
| 3397281 | 1092463 | 67.84% |
| 3149746 | 1124451 | 64.30% |
| 3354686 | 1104195 | 67.08% |

As revealed in Table 2, the total time consumed before speedup is started is 38146119 whereas total time consumed after speedup is started is 13540962, and the average speedup ratio is 64.50%.

With the method provided in the embodiments of the present invention, logic for implementing the cache database is added at the browser end. In this way, no matter a Web server or a proxy server complies with the HTTP cache protocol, Web page speedup can be achieved. In addition, the Web page collection process does not distinguishing dynamic Web pages from static Web pages, and therefore the embodiments of the present invention also speed up access of dynamic Web pages.

Embodiment 3

Referring to FIG. 3, an embodiment of the present invention provides an apparatus for speeding up Web page access, where the apparatus includes: an acquiring module 301, a judging module 302, and a processing module 303.

The acquiring module 301 is configured to acquire a URL address initiated by a user.

The judging module 302 is configured to judge whether the URL address is stored in a preset cache database, wherein the cache database stores a plurality of mapping relationships between URL addresses and cache data.

a processing module 303, configured to: when the judging module judges that the URL address is stored in the preset cache database, acquire cache data corresponding to the URL from the cache database, process the cache data, and render the Web page.

Figure 4:
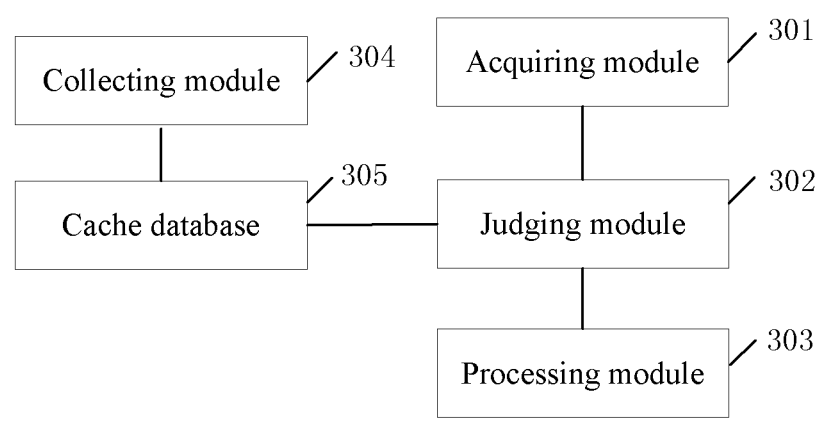
FIG. 4 is another schematic structural diagram of the apparatus for speeding up Web page access according to Embodiment 3 of the present invention.

Furthermore, as shown in FIG. 4, the apparatus further includes a collecting module 304 and a cache database 305.

The collecting module 304 is configured to collect a plurality of Web pages according to a preset data collection program to acquire N URL addresses, N being an integer greater than 1, and acquire cache data corresponding to each of the N URL addresses.

The cache database 305 configured to store each of the N URL addresses collected by the collecting module and the cache data corresponding to each of the N URL addresses.

The collecting module 304 specifically includes a judging unit and a collecting unit.

The judging unit is configured to judge, according to M collection factors included in the preset data collection program, the URL address of each of the plurality of Web pages satisfies one of the M collection factors, M being an integer greater than 1.

The collecting unit is configured to acquire the URL address when the judging unit judges that the URL address of the Web page satisfies one of the M collection factors.

The collection factors includes at least update times of the URL address, update time of the URL address, and status code of the URL address.

The processing module 303 includes an acquiring unit and a processing unit.

The acquiring unit is configured to: when the judging module judges that the URL address is stored in the preset cache database, judge whether the current browser is IE kernel-based or webkit kernel-based; when the current browser is IE kernel-based, call Asynchronous Pluggable Protocols and acquire the cache data corresponding to the URL address from the cache database; when the current browser is webkit kernel-based, call an interface for proactive resource notifications and acquire the cache data corresponding to the URL address from the cache database; and The processing unit is configured to process the cache data and render the Web page.

With the apparatus provided in the embodiments of the present invention, logic for implementing the cache database is added at the browser end. In this way, no matter a Web server or a proxy server complies with the HTTP cache protocol, Web page access can be speeded up. In addition, the Web page collection process does not distinguishing dynamic Web pages from static Web pages, and therefore the embodiments of the present invention also speed up access of dynamic Web pages.

It should be noted that, during speedup of Web page access, the apparatus for speeding up Web page access according to the above embodiments only is described by only using division of the above functional modules for description. In practice, the functions may be assigned to different functional modules for implementation as required. To be specific, the internal structure of the apparatus is divided into different functional modules to implement all or part of the above-described functions. In addition, the apparatus for speeding up Web page access and the method for speeding up Web page access pertain to the same concept, where the specific implementation is elaborated in the method embodiments, which is not be detailed herein any further.

The sequence numbers of the preceding embodiments of the present invention are only for ease of description, but do not denote the preference of the embodiments.

A person skilled in the art should understand that all or part steps of the preceding methods may be implemented by hardware or hardware following instructions of programs. The programs may be stored in a computer readable storage medium. The storage medium may be a read only memory, a magnetic disk, or a CD-ROM.

In accordance with some implementations described above, a method of speeding up Web page access is performed at a device having memory and one or more processors. The device acquires a uniform/universal resource locator (URL) address initiated by a user; judges whether the URL address is stored in a preset cache database, wherein the cache database stores a plurality of mapping relationships between URL addresses and cache data; and when it is judged that the URL address is stored in the preset cache database, the device acquires cache data corresponding to the URL address from the cache database, processes the cache data, and renders the Web page. The device may be a portable device, such as mobile terminal, or non-portable device, such as PC.

In accordance with some implementations described above, a method of speeding up Web page access is performed at a computer program embodied on a computer-readable medium. The computer-readable medium may be a read only memory, a magnetic disk, or a CD-ROM.

Described above are merely embodiments of the present invention, and the above description is not intended to limit the present invention. Any modification, equivalent replacement, or improvement made without departing from the spirit and principle of the present invention should fall within the protection scope of the present invention.

What is claimed is:

1. A method for speeding up Web page access, comprising:
   acquiring a uniform/universal resource locator (URL) address initiated by a user;
   judging whether the URL address is stored in a preset cache database, where the cache database stores a plurality of mapping relationships between URL addresses and cache data; and
   when it is judged that the URL address is stored in the preset cache database, acquiring cache data corresponding to the URL address from the cache database, processing the cache data, and rendering the Web page;
   wherein the acquiring cache data corresponding to the URL address from the preset cache database comprises:
      judging whether the current browser is IE kernel-based or webkit kernel-based;
      when the browser is IE kernel-based, calling Asynchronous Pluggable Protocols and acquiring the cache data corresponding to the URL address from the cache database; and
      when the browser is webkit kernel-based, calling an interface for proactive resource load notification and acquiring the cache data corresponding to the URL address from the cache database.

2. The method according to claim 1, wherein before acquiring a URL address initiated by a user, the method further comprises:
   collecting a plurality of Web pages according to a preset data collection program to acquire N URL addresses, N being an integer greater than 1; and
   acquiring cache data corresponding to each of the N URL addresses, and storing the N URL addresses and the cache data corresponding to each of the N URL addresses in a cache database.

3. The method according to claim 2, wherein the data collection program comprises M collection factors, M being an integer greater than 1; and the collecting a plurality of Web pages according to a preset data collection program to acquire N URL addresses comprises:
   judging whether the URL address of each of the plurality of Web pages satisfies one of the M collection factors; and
   acquiring the URL address when the URL address of the Web page satisfies one of the M collection factors.

4. The method according to claim 3, wherein the collection factors comprise at least the number of update times of the URL address, update time of the URL address, and status code of the URL address.

5. An apparatus for speeding up Web page access, comprising:
   an acquiring module, configured to acquire a uniform/universal resource locator (URL) address initiated by a user;
   a judging module, configured to judge whether the URL address is stored in a preset cache database, wherein the cache database stores a plurality of mapping relationships between URL addresses and cache data;
   a processing module, configured to: when the judging module judges that the URL address is stored in the preset cache database, acquire cache data corresponding to the URL from the cache database, process the cache data, and render the Web page;
   wherein the processing module comprises an acquiring unit and a processing unit; and
   wherein
      the acquiring unit is configured to: when the judging module judges that the URL address is stored in the preset cache database, judge whether the current browser is IE kernel-based or webkit kernel-based; when the current browser is IE kernel-based, call Asynchronous Pluggable Protocols and acquire the cache data corresponding to the URL address from the cache database; when the current browser is webkit kernel-based, call an interface for proactive resource notifications and acquire the cache data corresponding to the URL address from the cache database; and
      the processing unit is configured to process the cache data and render the Web page.

6. The apparatus according to claim 5, further comprising a collecting module and a cache database; wherein
   the collecting module is configured to collect a plurality of Web pages according to a preset data collection program to acquire N URL addresses, N being an integer greater than 1, and acquire cache data corresponding to each of the N URL addresses; and
   the cache database is configured to store each of the N URL addresses collected by the collecting module and the cache data corresponding to each of the N URL addresses.

7. The apparatus according to claim 6, wherein the collecting module comprises a judging unit and a collecting unit; wherein
   the judging unit is configured to judge, according to M collection factors comprised in the preset data collection program, the URL address of each of the plurality of Web pages satisfies one of the M collection factors, M being an integer greater than 1; and
   the collecting unit is configured to acquire the URL address when the judging unit judges that the URL address of the Web page satisfies one of the M collection factors.

8. The apparatus according to claim 7, wherein the collection factors comprise at least update times of the URL address, update time of the URL address, and status code of the URL address.

9. A device for speeding up Web page access, wherein the device includes:
   memory, and
   one or more processors,
   wherein the one or more processors are configured to:
      acquire a uniform/universal resource locator (URL) address initiated by a user;
      judge whether the URL address is stored in a preset cache database, wherein the cache database stores a plurality of mapping relationships between URL addresses and cache data; and when it is judged that the URL address is stored in the preset cache database, acquire cache data corresponding to the URL address from the cache database, process the cache data, and render the Web page;

wherein the one or more processors are further configured to:

judge whether the current browser is IE kernel-based or webkit kernel-based;

when the browser is IE kernel-based, call Asynchronous Pluggable Protocols and acquire the cache data corresponding to the URL address from the cache database; and when the browser is webkit kernel-based, call an interface for proactive resource load notification and acquire the cache data corresponding to the URL address from the cache database.

10. The device according to claim 9, wherein the one or more processors are further configured to:

collect a plurality of Web pages according to a preset data collection program to acquire N URL addresses, N being an integer greater than 1; and acquire cache data corresponding to each of the N URL addresses, and store the N URL addresses and the cache data corresponding to each of the N URL addresses in a cache database.

11. The device according to claim 9, wherein the one or more processors are further configured to:

judge whether the URL address of each of the plurality of Web pages satisfies one of the M collection factors; and acquire the URL address when the URL address of the Web page satisfies one of the M collection factors.

12. The device according to claim 9, wherein the collection factors comprise at least the number of update times of the URL address, update time of the URL address, and status code of the URL address.

\* \* \* \* \*